Jan. 13, 1953 W. S. SUTOWSKI 2,625,449
BEARING ASSEMBLY
Filed Oct. 15, 1948

INVENTOR.
Walter S. Sutowski
BY
Woodling and Krost,
Attorneys

Patented Jan. 13, 1953

2,625,449

UNITED STATES PATENT OFFICE 2,625,449

BEARING ASSEMBLY

Walter S. Sutowski, Garfield Heights, Ohio, assignor to Freeway Washer and Stamping Company, a corporation of Ohio Application October 15, 1948, Serial No. 54,661

6 Claims. (Cl. 308—196)

My invention relates to bearing assemblies or units and to the method of making the same.

In general, the subject matter of my invention is related to the subject matter of the following United States patents, which, however, do not disclose the article and method herein described and claimed: Nice, 1,677,841, July 17, 1928; Kuckuck, 1,695,017, December 11, 1928; Wing, 1,742,840, January 7, 1930; Clark, 1,903,776, April 18, 1933; Bohn, 1,909,747, May 16, 1933; Bohn, 1,909,748, May 16, 1933; Vallone, 1,965,785, July 10, 1934; and Smith, 2,315,357, March 30, 1943.

My bearing unit may be used in porch gliders or in other apparatus wherein incorporation of a bearing unit of this general type is appropriate.

An object of my invention is to provide an improved bearing assembly or unit which is economical in construction and efficient in use.

Another object is the provision of a device of this character having a minimum of parts and requiring a minimum of operations to make the same.

Another object is the provision of a bearing unit having the outer race firmly secured to a supporting member to prevent axial and lateral movement of the race relative to the supporting member.

Another object of my invention is to provide a bearing unit which is sturdy in construction and which bears up under long continued use.

Another object is the provision of an improved method of fabricating bearing units to provide an improved unit with an economy of operation in fabricating the same.

Another object is the provision of a new method for securing the outer race of a bearing assembly to a supporting member.

Other objects and a fuller understanding of my invention may be had by referring to the accompanying drawing in which like reference characters denote like parts, the drawing depicting a preferred embodiment of my invention.

Figure 1:
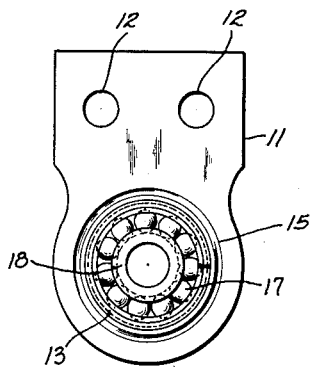
Figure 1 is a view of one of my bearing units.
Figure 2:
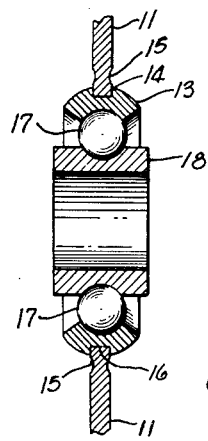
Figure 2 is an enlarged cross-sectional view through a portion of my bearing unit.
Figure 3:
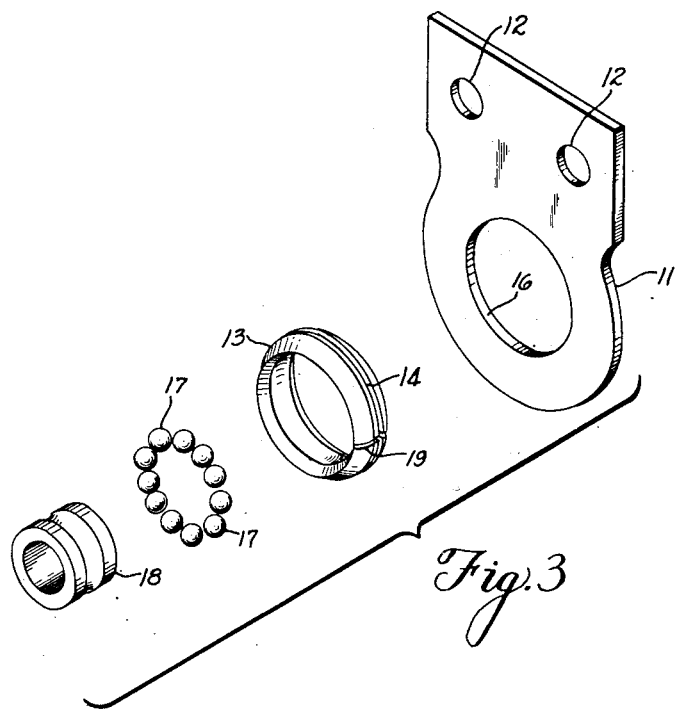
Figure 3 is an exploded view showing the several parts of my bearing unit before assembly.

In the bearing unit herein shown and described, there is a plate 11 which is a supporting member for carrying the bearing. The plate 11 is of suitable metal appropriate for the herein described purpose, and is preferably of relatively soft steel or of iron, wherein the metal is capable of flowing or being displaced upon a peening operation.

The plate 11 has a round portion at one end to which the bearing parts are assembled. At the other end there is a rectangular portion adapted to be secured or anchored to a part of an apparatus in which the bearing unit is to be incorporated. Small holes 12 are provided for accommodating screws, bolts or other securing means used for the attachment of the plate 11 to the appropriate part of such an apparatus.

Formed in the rounded part of the plate 11 is a larger round opening having an edge portion 16 extending around this central opening. By reason of the round shape of the opening the edge portion 16 is annular in form. The plate 11, with its small holes 12 and the large central opening, is preferably formed by stamping or by other suitable means.

The bearing parts proper comprise an outer ball race 13, an inner ball race 18, and a plurality of ball bearings 17 interposed between the inner and outer races. The inner circumferential wall of the outer race 13 and the outer circumferential wall of the inner race 18 are concave to provide a round and continuous course for the plurality of ball bearings 17.

The outer race 13 is provided with an annular channel, recess or groove 14 in its outer circumferential wall. This channel 14 is annular in form and extends around the circumference of the race 13. As formed, and prior to assembly, the width of the groove 14 is slightly greater than the thickness of plate 11, so that edge portion 16 adjacent the central opening of the plate may be moved into the channel 14.

The race 13 is in the form of a split ring, as indicated in the drawing. The size of the race 13 relative to the central opening of plate 11 is such that the race 13 may be moved into and centrally disposed in the large opening. To obtain a snug fit and to enable the race 13 to be positioned in the opening of plate 11, the race 13 may be slightly compressed, closing the gap at the split of the ring. The resiliency of the split ring 13 may be such as to cause the ring to expand after it is positioned in the plate, and to cause the annular edge portion 16 to partially and loosely project into the annular groove 14. This alone, however, provides a rather sloppy and loose fit and not too firm a securement. Also, it permits too large a gap at the location of the split in the ring, whereas it is desired that this gap be substantially closed to provide a smooth course for the ball bearing 17.

To provide for a secure engagement and anchoring of the outer race 13 to the plate 11, I force the metal of the edge portion 16 down into the groove 14 in tight engagement with the inner walls of the groove 14. This is done by peening the plate 11 at a location next adjacent to the edge portion 16. Preferably, I peen the metal on both sides of the plate 11, and so squeeze and force the metal as to cause it to flow radially inward of the large central opening and into the groove 14 to fill the same and to frictionally engage the inner walls of the groove. This cramps or compresses the edge portion 16 to cause it to press radially inward upon the outer race 13. This not only firmly secures the plate 11 and race 13 together, but also resiliently compresses the race 13 to close the gap of the split in the ring to the extent that the race or ring 13 resiliently expands after the positioning of the race or ring 13 centrally in the large opening in plate 11. This operation therefore also closes the gap indicated as 19 of the race 13 in split ring form. Thus, after the peening operation, the inner annular wall of race 13 provides a smooth and continuous surface for the ball bearing 17.

By the peening operation there is produced in the plate 11 circular recesses 15 on the opposite sides of the plate 11 adjacent the edge portion 16. These circular recesses 15 are formed by the peening tool indenting the metal of the plate and squeezing it to flow radially inward into the groove 14. As it is preferred to simultaneously peen the metal on both sides of the plate there will be formed a recess 15 on each side of the plate, the recesses extending toward each other.

It is preferred that two peening tools of circular form be used. These may be set up in a press and the assembled parts positioned so that upon operation of the press the peening tools are moved toward each other to peen the plate 11, indenting the metal to form recesses 15 and causing the metal to flow into the grooves 14. While the best results are obtained by the simultaneous use of two circular peening tools, a peening action may be obtained by peening the metal on one side of the plate and properly supporting the other side of the plate with a flat surface. Also, while it is preferred to peen the metal in a continuous circle around the race 13, this may be modified by peening the metal at a plurality of intervals at locations surrounding the annular edge portion 16. When this is done the recesses 15 are not in the form of the continuous circle, but rather comprise a series of segments of a circle.

A bearing unit having the construction herein defined and made by the method herein disclosed, has the outer race firmly secured to the plate 11 so that the race 13 does not revolve relative to plate 11, does not move laterally in the opening provided in plate 11, and does not move axially of the said opening. A rigid and firm support is given to the outer race so that it is held in proper axial alignment and is strongly supported. A minimum amount of material is utilized in the unit, and a minimum amount of labor and operations are required in fabricating the same.

In assembling my unit, I first "nest" or assemble in proper relationship to each other the outer ball race 13, the ball bearings 17, and the inner race 18. While the outer race 13 is still separate from the plate 11 the split 19 provided therein permits the race 13 to expand so that the balls 17 and inner race 18 may be positioned therein. After the ball 17 and race 18 are in position, then the resiliency of race 13 permits the race 13 to contract and to hold the parts in relative position. The assembled parts 13, 17 and 18 are then positioned in the large central opening of plate 11, and to the extent necessary to get the race 13 in the opening it may be slightly compressed until it is in the proper position in the opening. The assembled parts 13, 17 and 13 in the plate 11 may then be placed in a fixture, and the peening tool, carried by a press or otherwise, is applied to plate 11 so as to perform the described peening operation. After the peening, all of the parts are firmly held together and the unit is ready for use.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bearing assembly comprising in combination a metal plate having a round opening therein, a split outer ball race having an annular channel disposed in its outer circumferential wall, an inner ball race, and a plurality of ball bearings positioned between said inner and outer ball races, the annular edge portion of said plate adjacent said round opening, the said annular channel and the centers of said ball bearings being disposed substantially in one plane, the said annular edge portion being disposed within said channel to tightly engage and compress said outer ball race in said plane for rigid support of said outer ball race by said plate in said plane.

2. In a ball bearing unit having a plurality of ball bearings, an inner ball race and a split outer ball race, the centers of said ball bearings being disposed in one plane, the improvement of an outer ball race having an annular channel disposed in its outer circumferential wall and disposed in said plane, a metal supporting plate, said plate having a round opening for accommodating said outer ball race, the diameter of said opening being less than the outside diameter of said outer ball race, the edge portion of sadi plate around said opening being arranged in said plane and being disposed in said channel in firm engagement with the walls of said channel to radially compress said outer ball race and to secure said outer ball race and plate together against movement relative to each other, the arrangement providing that radial lines of force imparted to the bearing unit extend through said plate in said plane.

3. In a bearing unit having a plurality of ball bearings and inner and outer races engaging said bearings in a circular path disposed in a plane, the improvement of a split outer race having an annular recess formed in its outer circumferential wall and extending therearound, said recess being disposed in said plane and the side walls thereof being substantially equidistantly spaced on opposite sides of said plane, a supporting member, said supporting member having an opening for accommodating said outer race, the said supporting member having an edge portion adjacent and extending around said opening in said plane, said edge portion substantially filling said recess and frictionally engaging said side walls of said recess on said opposite sides of said plane and radially compressing said outer race to narrow said split, the arrangement of said supporting member and outer race providing for securement of the outer race to said supporting member against circumferential and axial movement relative thereto and for directing of radial thrust between said outer race and supporting member in said plane.

4. In a bearing unit having a plurality of ball bearings and inner and outer races holding said bearings in a circular path disposed in a plane, the improvement of a split outer race having a recess in its outer circumferential wall, the center of said recess being disposed substantially in said plane, a supporting plate of peenable material having an opening for accommodating said outer race, said supporting plate having an edge portion adjacent said recess and dispossed in said plane, said edge portion being peened metal extended into said recess, said peened metal in said recess anchoring the outer race to said plate in said plane and compressing said outer race to substantially close the split of said race at said plane to provide a smooth continuous course for said ball bearings.

5. A bearing assembly comprising in combination, a split and resilient outer ball race, said outer ball race having a radially disposed shoulder formed on the outer annular wall thereof, an inner ball race, a plurality of ball bearings positioned between said inner and outer ball race, and a supporting member tightly engaging and compressing said outer ball race to narrow said split and to secure said outer ball race to said supporting member, said supporting member having a portion engaging the said shoulder to limit axial movement of said outer ball race relative to said supporting member.

6. In a bearing unit having a plurality of ball bearings and inner and outer races holding said bearings in a circular path, the improvement of a split outer race resiliently expandable from normal position for insertion of said bearings between the inner and outer race and resiliently compressible from normal position to narrow said split, said outer race having an annular shoulder extending around its outer wall and intermediate the opposite walls defining the axial length of said race, said outer race being mountable to a supporting member tightly engaging and compressing said outer race for narrowing said split, and being engageable by said supporting member abutting said shoulder to limit axial movement of said race relative to said supporting member.

WALTER S. SUTOWSKI.

REFERENCES CITED

The following references are of record in the file of this patent:

UNITED STATES PATENTS

| Number | Name | Date |
|---|---|---|
| Re. 10,022 | Trageser | Jan. 31, 1882 |
| 951,503 | Johnston | Mar. 8, 1910 |
| 1,903,776 | Clark | Apr. 18, 1933 |
| 2,137,987 | Smith | Nov. 22, 1938 |
| 2,160,598 | Melrath | May 30, 1939 |
| 2,277,635 | Delaval-Crow | Mar. 24, 1942 |
| 2,308,471 | Schwartz | Jan. 12, 1943 |
| 2,443,501 | Greenlee | June 15, 1948 |

FOREIGN PATENTS

| Number | Country | Date |
|---|---|---|
| 2,607 | Great Britain | 1906 |